United States Patent
Wolzak

[15] 3,687,258
[45] Aug. 29, 1972

[54] DEVICE FOR TRANSFORMING THE DIRECTION OF MOVEMENT WITH RESPECT TO THE MAIN LINE OF SYMMETRY OF A ROW OF ADVANCING CYLINDRICAL CONTAINERS

[72] Inventor: Willem Wolzak, Landsmeer, Netherlands

[73] Assignee: Stork - Amsterdam M.V., Amstelveen, Netherlands

[22] Filed: Sept. 22, 1970

[21] Appl. No.: 74,273

[30] Foreign Application Priority Data

Sept. 25, 1969 Netherlands............6914546

[52] U.S. Cl.............................198/20 R, 198/45
[51] Int. Cl................................B65g 47/00
[58] Field of Search..........................198/20

[56] References Cited

UNITED STATES PATENTS

| | | | |
|---|---|---|---|
| 3,197,013 | 7/1965 | Van Der Winden | 198/20 |
| 2,926,767 | 3/1960 | Bersa | 198/20 X |
| 2,156,248 | 4/1939 | Wegner | 198/20 |

*Primary Examiner*—Richard E. Aegerter
*Assistant Examiner*—Douglas D. Watts
*Attorney*—Waters, Roditi, Schwartz & Nissen

[57] ABSTRACT

Device for transforming the relative position of each container in an advancing row of cylindrical containers, comprising a horizontal feed path, a sidewardly inclined conveyor, a supporting ledge near said conveyor and means for reducing the horizontal velocity of each container at a position at the lower side of said conveyor.

5 Claims, 3 Drawing Figures

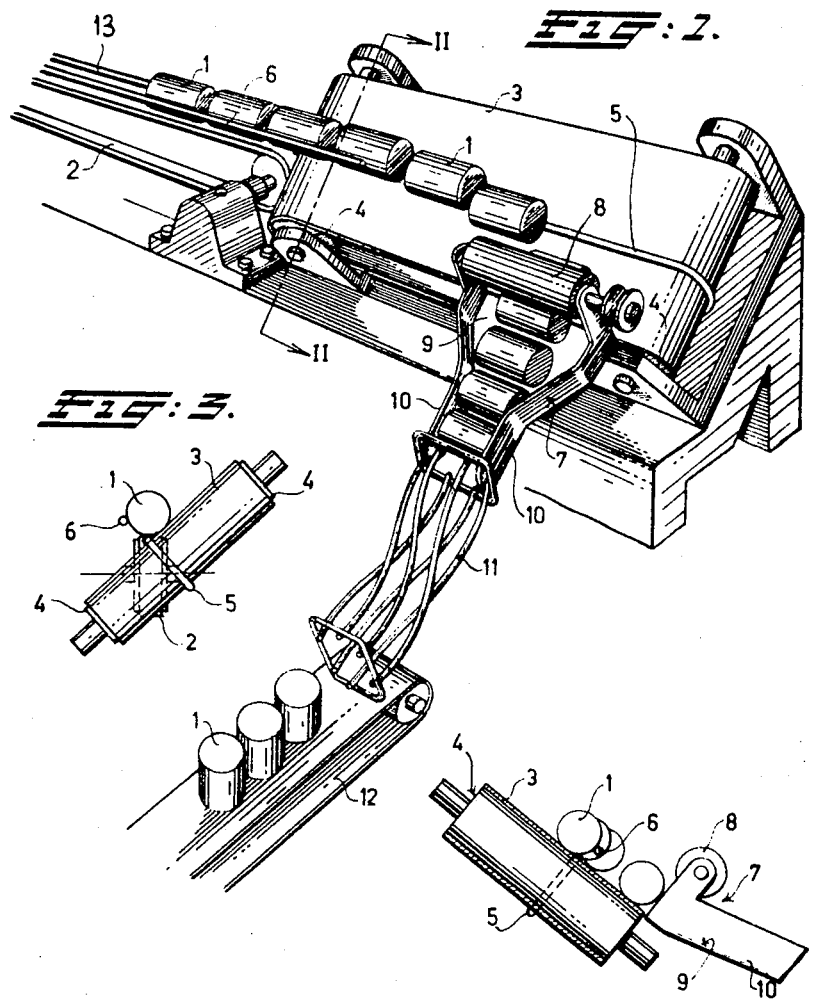

3,687,258

DEVICE FOR TRANSFORMING THE DIRECTION OF MOVEMENT WITH RESPECT TO THE MAIN LINE OF SYMMETRY OF A ROW OF ADVANCING CYLINDRICAL CONTAINERS

BRIEF DISCUSSION OF THE PRIOR ART

The invention relates to a device for transforming the direction of movement with respect to the main line of symmetry of a row of advancing substantially cylindrical containers comprising a mainly horizontally extending feeding conveyor devised to feed the containers forward in the direction of their main axis of symmetry, a conveying surface adjoining the feeding conveyor and slanting in a transverse direction and likewise horizontally movable for permitting a downward rolling movement of the containers without same performing a tilting movement and means for reducing to zero the velocity of the containers imparted thereto by the feeding conveyor, while between these means and the discharge end of the feeding conveyor a path covered by the conveying surface is provided where the containers can roll downwards under the influence of gravity.

Such a device is known from U.S. Pat. No. 3,197,013 according to which, in order to avoid a tilting movement of the containers at the moment they leave the feeding conveyor and entirely bear on the inclined conveying surface, a magnet is used which is arranged under the conveying surface. The application of such a magnet is useful only when the cylindrical containers consist of steel cans, such as tins containing preserved food. This known device can therefore not be applied to change the direction of movement of a row of glass jars.

SUMMARY OF THE INVENTION

It is an object of the invention to provide a device of the aforementioned type which is not restricted to ferrous metal containers but which can treat both tins and glass jars and like cylindrical containers.

For that purpose the invention suggests a device wherein a ledge is mounted adjacent to the conveying belt, said ledge lying approximately flush with the supporting surface of the feeding conveyor. Due to this feature the torque exerted by the force of gravity on the container moving away from the feeding conveyor will remain so small that the coefficient of friction between the container and the ledge together with the support by the feeding conveyor suffices to retard the beginning of the rolling down of the containers until they are entirely free from the feeding conveyor.

It goes without saying that the location of the ledge and the dimensions and profile thereof should be selected as a function of the dimensions of the containers and the slope of the conveying surface in such a manner that the ledge prevents the containers from tilting, but that the containers can still roll over the ledge.

The invention will be clarified with reference to the accompanying drawing in which an embodiment of the invention is represented.

In the drawing:

FIG. 1 is a perspective view of a device provided in accordance with the invention;

FIG. 2 is a section along line II — II of FIG. 1, and

FIG. 3 represents diagrammatically the junction between the feeding conveyor and the inclined conveying surface according to FIGS. 1 and 2.

DESCRIPTION OF A PREFERRED EMBODIMENT

A row of containers 1 is fed in forward direction via a feeding conveyor 2. The relative position of the containers 1 in the row is such that the bottom of the one container is adjacent the cover of the next container and vice versa. In this relative position, the row of containers is treated in a sterilizer (not shown) and periodically a row of containers is discharged from this plant and placed on the conveyor 2. During further transport of the containers, it is required to transform the relative positions of containers in the row in such a manner that the cylindrical surfaces of the juxtaposed containers are adjacent each other, while the advance of the containers 1 in a direction perpendicular to the bottom and the cover is transformed into an advance parallel to the bottom and the cover.

For that purpose, a movable conveying surface 3 is provided consisting of an endless rubber belt running over two rollers 4 one of which is driven. Any point of this surface 3 moves according to a substantially horizontal path, but in the transverse direction the surface is inclined at an angle of about 45° with respect to the horizontal. The surface 3 adjoins the conveyor 2, while the speed of the two devices is substantially identical. An adjustable supporting member 6 for the containers 1 belongs to the feeding conveyor 2 and is arranged in the proximity of the lower side of the row of containers 1. This supporting member 6 extends along the beginning of the surface 3. A corresponding supporting device 13 on the other side of the containers extends less far and ends before the transporting surface 3 at the location where the feeding conveyor 2 ends as well.

Finally, means 7 are provided for reducing to zero the original feeding velocity of the containers 1. These means are known per se from U.S. Pat. No. 3,197,013 and consist of a lined rotatable roller 8 and a plate 9 which together with the side walls 10 constitute an inclined discharge chute for the containers 1 which at that moment have already experienced a relative change of position with respect to the row fed on the conveyor 2. The distance from the outer surface of the lining of the roller 8 to the plate 9 is slightly smaller than the diameter of the containers 1.

According to the invention, the conveying surface 3 is provided with a rectilinear ledge 5 the profile of which appears further from FIG. 2. It is, however, also possible to use a small bar or wire near the surface of the belt 3.

The device operates as follows:

The containers 1 fed in forward direction on the conveyor belt 2 are during this movement laterally supported by the members 6 and 13. After the containers 1 have left the conveyor 2 and are passed through at the same rate by means of the moving surface 3, the containers are initially supported by the member 6 (see FIG. 3). Due to the ledge 5 the torque exerted by the force of gravity is so small that, partially owing to the coefficient of friction, the containers will not suffer an absolute change of position (they do not tilt) on passing by the end of the supporting member 6. Only when a container 1 is entirely free from the supporting member 6, the force of acceleration acting in the transverse direction (in the present case a component of the force of gravity) brings about a displacement in the transverse direction due to the rolling of the cylindrical containers on the inclined surface 3. The container will thereby jump over the ledge 5 but will remain horizontally directed (see FIG. 2).

Between two consecutive containers 1, the distance covered in the direction of the aforementioned component of the force of gravity will gradually increase (see FIG. 2). The roller 8 is positioned in such a manner that the downwardly rolling containers 1, which simultaneously are rectilinearly taken along on the surface 3, only come into contact therewith when the said covered distance (i.e. downward along the inclined surface 3) is at least equal to the diameter of the containers, so that the foremost container is entirely free from the next following one.

The roller 8 is covered with a material with a high coefficient of friction, so that the kinetic energy of the containers in the original horizontal direction of feed is quickly reduced to zero without a slowing down force being produced in the direction of the discharge. The latter circumstance is promoted by driving the roller 8 at a rotary speed such that the circumferential velocity is at least equal to the circumferential velocity of the upper part of the containers 1 rolling down the inclined surface 3.

As is visible in FIG. 2, the part of the plate 9 which is situated opposite the roller 8 can be curved over a short distance, concentrically to the roller 8, so that the time of conventional between the containers and the roller 8 is prolonged. The means 7 constructed in this way for reducing to zero the original velocity of feed of the containers 1 contribute to achieving, without a disturbing tilting movement, the change of direction aimed at. A conventional cage-shaped passage 11, closed on all sides, adjoins the chute 9, 10, this passage being twisted through 90° in a longitudinal direction for bringing the containers to erect position and delivering them in this position to a conveyor belt 12.

The chute 9, 10 and the passage 11 can be replaced to accommodate containers with a different height and/or diameter.

In order to relate the device, for example, to e.g. the diameter of the containers, the slope of the conveying surface 3 is preferably adjustable. The tilting can be effected around an axis parallel to the ledge 5, which axis preferably coincides both with the supporting face of the conveyor belt 2 and with the conveying surface 3. It should be noted that the device in practice is intended for a great capacity. For instance, 900 to 1,100 containers per minute can be passed through the device. In this connection, a dependable service of the transformer of direction is required on the one hand, while on the other hand, due to the high feeding speed in a horizontal direction, the tendency to tilting is not great so that the ledge prevents this tilting adequately.

The invention renders it possible to obtain a relative change of position of a row of containers without any limitation with respect to the material of which the containers are made.

What I claim is:

1. A device for transforming the direction of movement of containers with respect to a main axis of symmetry of a row of advancing substantially cylindrical containers, said device comprising a generally horizontally extending feeding conveyor having a container supporting face and adapted to feed the containers forwardly in the direction of said main axis of symmetry, first means having a conveying surface adjoining the feeding conveyor, said surface slanting in a direction transverse of said axis and being horizontally movable in continuation of said conveyor, said surface enabling a downward rolling movement of the containers, following discharge of the latter from said conveyor, without the containers performing a tilting movement, second means for receiving containers from said surface and reducing to zero the velocity of the containers in forward direction, and a ledge between said second means and the feeding conveyor to receive containers from the latter, said ledge being a low ridge integral with the conveying surface and lying approximately flush with the supporting face of the feeding conveyor.

2. A device according to claim 1 comprising means by which the inclined conveying surface can be tilted around an axis parallel to the ledge and at a relatively minor distance therefrom.

3. A device according to claim 1 wherein said feeding conveyor includes a supporting member extending therealong and partly over said conveying surface for guiding the containers, said ledge being so constructed and arranged relative to the degree of slanting of said conveying surface that each said container is restrained from rolling down said conveying surface until completely free of said supporting member.

4. A device according to claim 3 wherein said ledge is a rectilinear member.

5. A device according to claim 4 wherein the ledge is parallel to said axis and positioned to receive containers discharged by said feeding conveyor.

* * * * *